March 27, 1951     E. J. BLOOMER     2,546,355
WINDSHIELD DEFROSTER
Filed May 2, 1949

Inventor:
Edward James Bloomer
By: Autherstonhaugh & Co
his Atty's.

Patented Mar. 27, 1951

2,546,355

UNITED STATES PATENT OFFICE 2,546,355

WINDSHIELD DEFROSTER

Edward James Bloomer, Winnipeg, Manitoba, Canada

Application May 2, 1949, Serial No. 90,882

1 Claim. (Cl. 219—19)

My invention relates to new and useful improvements in windshield defrosters, an object of my invention being to provide a device of the character herewithin described whereby air ducted to the inside of windshields of automobiles can be preheated by an electric element thereby preventing the formation of frost on the windshield.

A further object of my invention is to provide a device of the character herewithin described which may readily be attached to conventional windshield vents.

Another object of my invention is to provide a device of the character herewithin described which, in an alternative embodiment, may be inserted within the ducts leading to the conventional windshield vents.

A still further object of my invention is to provide a device of the character herewithin described which is economical in manufacture, simple in operation, and which otherwise is well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
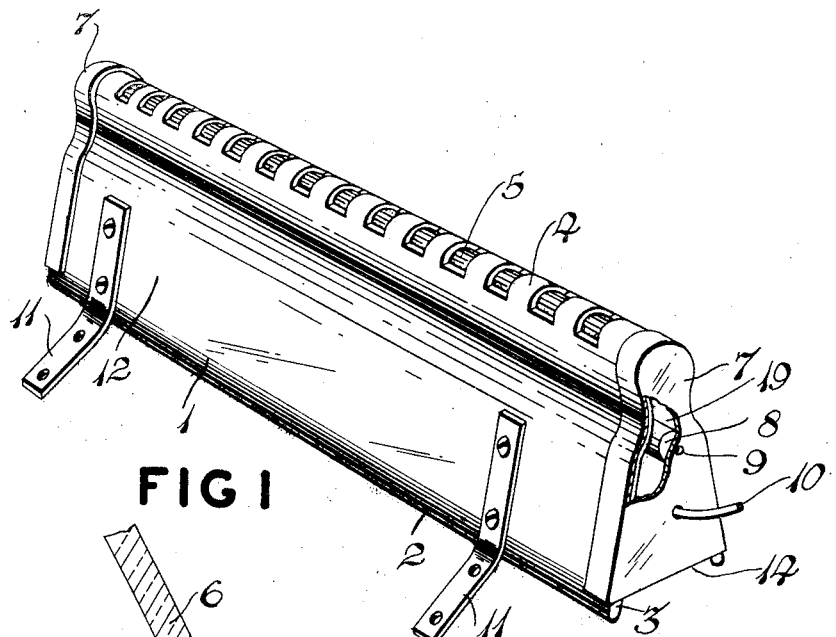
Figure 1 is a perspective representation of my device sectioned in part to show the location of the heating element.

Considerable difficulty is experienced, particularly in areas having a relatively cold winter, in preventing the formation of frost upon the inside of an automobile windshield, together with the formation of ice on the exterior thereof under certain atmospheric conditions. Many attempts have been made in the past to supply heat to the windshield, one method being to attach an electric element held within a framework to the interior of the windshield.

This method has the disadvantage of reducing the visibility through the windshield as it will be appreciated that the area remaining clear is limited by the size of the electric element.

Many automobiles are provided with vents at the base of the windshield to which may be ducted cold air or air warmed by the heating systems. Unfortunately, particularly during relatively cold weather, a conventional car heater takes some considerable time to circulate air having a temperature sufficient to maintain the windshield free of ice and frost, particularly if operated from the engine circulatory system. It is during this period of warm-up that frost forms readily upon the interior of the windshield and, if ice is being deposited upon the exterior during this time, the air issuing from the vent is ineffective.

The present invention relates to a device whereby air passing through the vent adjacent the lower side of the windshield may be preheated by means of an electric element thereby acting to prevent the formation of frost and ice as soon as the car is started.

Proceeding therefore to describe my invention in detail, it will be seen upon reference to the accompanying drawings that I have provided a longitudinally extending cuneiform housing 1 manufactured from sheet metal or the like, the lower edges 2 thereof being turned inwardly to form beading 3 which imparts rigidity thereto. Upon the apical ridge portion 4 of the housing is formed a series of spaced arcuate air discharge apertures 5 communicating with the interior of the housing through which the heated air passes to impinge against the associated windscreen 6 as will hereinafter be described.

End caps 7 are attached to the extremities of the housing as clearly shown in Figure 1 of the accompanying drawings and a heating element 8 in the form of an elongated cylinder extends therebetween being supported by means of pins 9 in a position subjacent the aforementioned apical discharge apertures 5. Current from the source of supply such as the power battery enters via conduit 10 and may be connected or disconnected by means of a conventional switch situated in a convenient location within the car body.

Attachment brackets 11 in the form of angulated strips are secured to the rear side 12 of casing 1 and support the defrosting unit upon the dash panel 13 of the automobile so that the lower open-end 14 of the housing overlies port 15 through which a supply of air may be routed in the conventional manner. In this connection I have provided a chafing strip 16 manufactured from rubber or the like against which the inner surface 17 of the rear side 12 may bear to prevent undue vibration with the upturned flange 18 of port 15.

Figure 2:
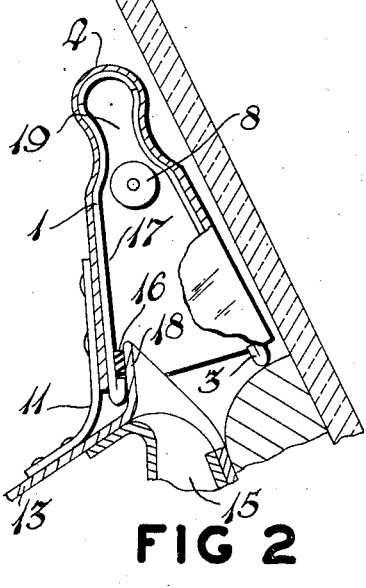
Figure 2 is a cross-sectional view showing my device in position above the windshield vent of an automobile.

In operation air passes through port 15 into the housing 1 and is then funnelled upwardly past the heating element 8 to be discharged through the apertures 5 adjacent the windshield 6. Figure 2 shows the formation of the housing and it will be seen that the sides of the housing are longitudinally concaved below the apical portion 4 to form a restriction throat 19. The apical portion 4, when viewed in cross section, has a rolled configuration which I define as an apertured semi-cylindrical apex and in conjunction with the aforementioned throat 19, ensures that the air passes around and in contact with the heating element 8 situated immediately therebelow.

Figure 3:
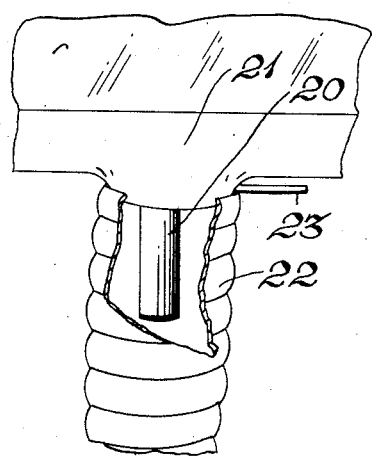
Figure 3 is a fragmentary representation of a portion of the duct leading to a windshield vent with an alternative embodiment of my device attached thereto.

Figure 3 of the accompanying drawings shows an alternative embodiment of my device wherein an electrical heating element 20 is attached subjacent the port 21 within the air duct 22, current enters via cable 23 being controlled by a switch in a conventional manner and supplies heat to the air passing through the duct 22 to the port 21.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A windshield defroster comprising for use in combination with the conventional warm air ports between the windscreen and dashboard of automobiles, an attachment embodying an elongated substantially cuneiform housing having an open underside overlying said port and an apertured apical ridge portion, an elongated electrical heating element in said housing, air from said port travelling upwardly through said housing and being constricted by the cuneiform configuration thereof while also being heated by said element and thereafter discharging through said apical apertures, the sides of said housing being longitudinally and oppositely concaved in the apical region thereof, said ridge having a rolled configuration to provide, when viewed in cross-section, an apertured semi-cylindrical apex and a restriction throat immediately therebelow, said element occupying a position immediately below said throat.

EDWARD JAMES BLOOMER.

REFERENCES CITED

The following references are of record in the file of this patent:

UNITED STATES PATENTS

| Number | Name | Date |
|---|---|---|
| 1,668,678 | Hassinger | May 8, 1928 |
| 1,790,419 | Heinemann et al. | Jan. 27, 1931 |
| 1,819,443 | Schillo et al. | Aug. 18, 1931 |
| 1,822,884 | Creighton | Sept. 15, 1931 |